United States Patent [19]
Harvey

[11] Patent Number: 5,116,553
[45] Date of Patent: May 26, 1992

[54] METHOD OF SURFACING SCREEN ORGANIZATION

[76] Inventor: Marty D. Harvey, Rte. 3, Box 856, Tuskugee, Ala. 36083

[21] Appl. No.: 636,204

[22] Filed: Dec. 31, 1990

[51] Int. Cl.⁵ .............................................. B29C 41/02
[52] U.S. Cl. .................................. 264/39; 264/135; 264/162; 264/219
[58] Field of Search ............... 264/39, 273, 129, 259, 264/132, 134, 135, 138, 162, 219, 225, 226, 227

[56] References Cited

U.S. PATENT DOCUMENTS

| | | | |
|---|---|---|---|
| 3,972,974 | 8/1976 | Pico | 264/259 |
| 4,100,248 | 7/1978 | Adams | 264/DIG. 70 |
| 4,115,507 | 9/1978 | Pico | 264/273 |
| 4,832,990 | 5/1989 | Boccalan et al. | 264/135 |

Primary Examiner—Jay H. Woo
Assistant Examiner—J. F. Durkin
Attorney, Agent, or Firm—Leon Gilden

[57] ABSTRACT

The steps of surfacing a screen organization to include an initial mechanical cleaning of the screen organization by tools such as a sandblasting type member to direct abrasive particulates against the screen to effect a roughened surface on the screen. Subsequently, a coating of glue is applied to a bottom surface of the screen, whereupon the screen is positioned within a recessed cavity of a container. Parallelepiped block members are positioned within the openings defined by the screen organization, whereupon subsequently a fluid polymeric, such as polyurethane, is directed within the container, whereupon subsequent curing of the polyurethane permits removal of the newly surfaced screen organization.

1 Claim, 6 Drawing Sheets

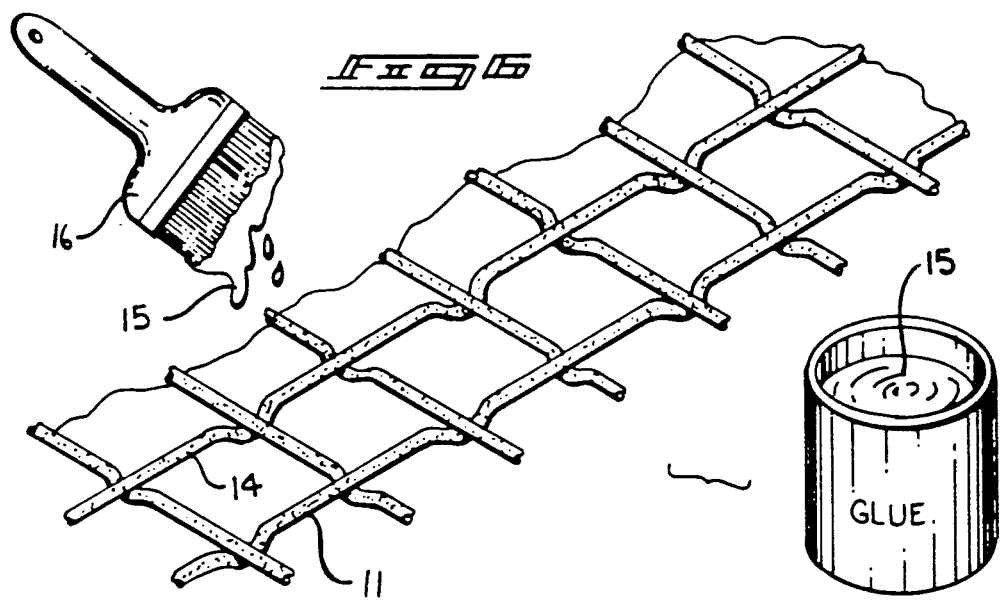
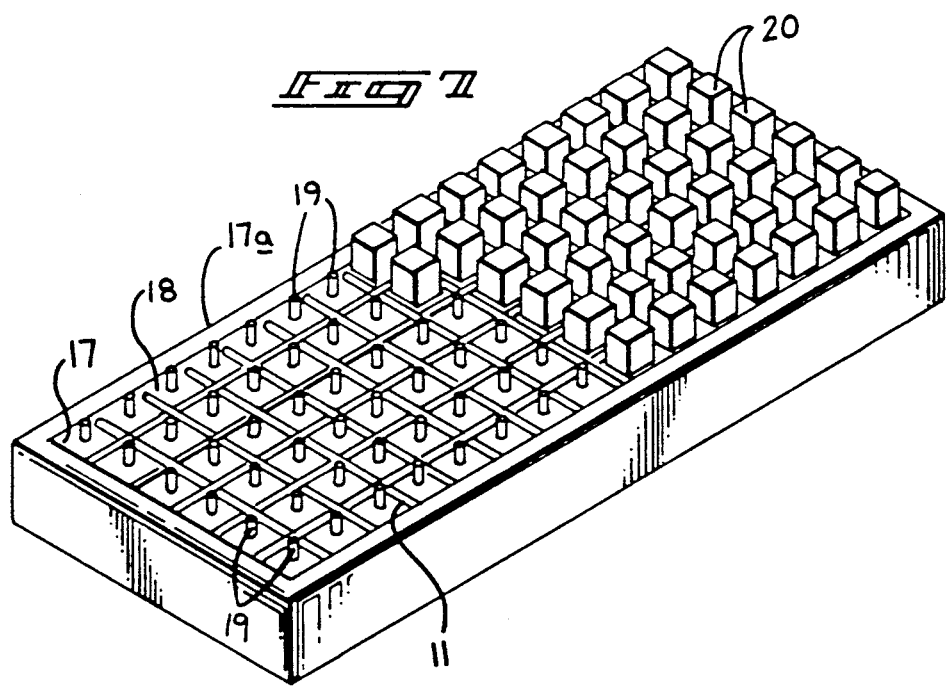

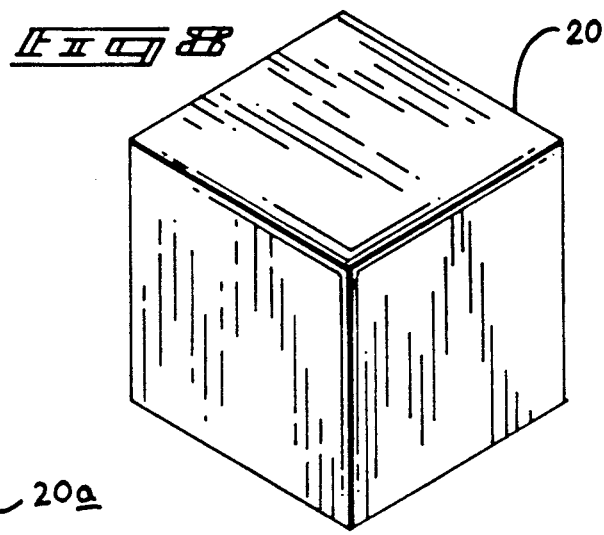
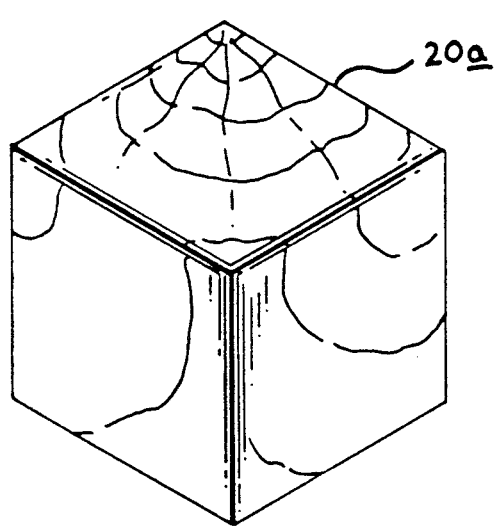
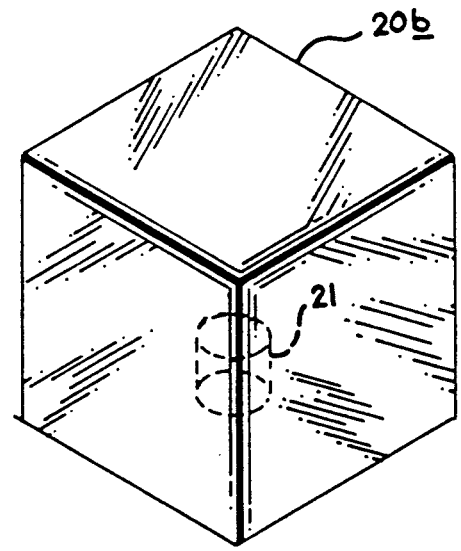

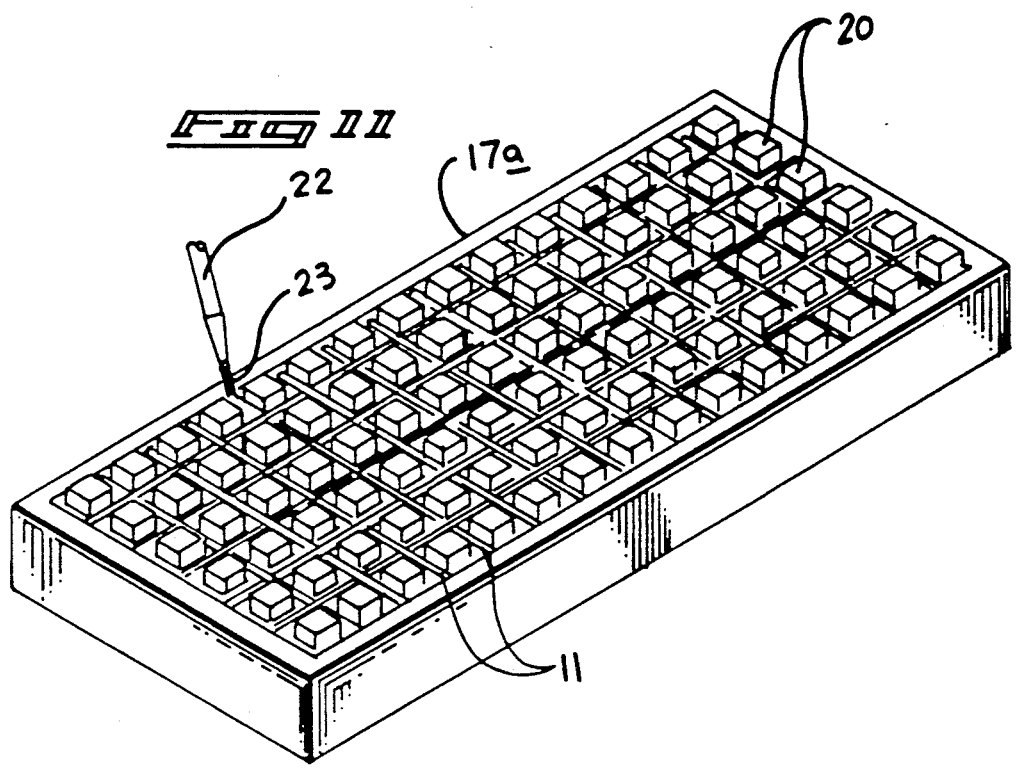
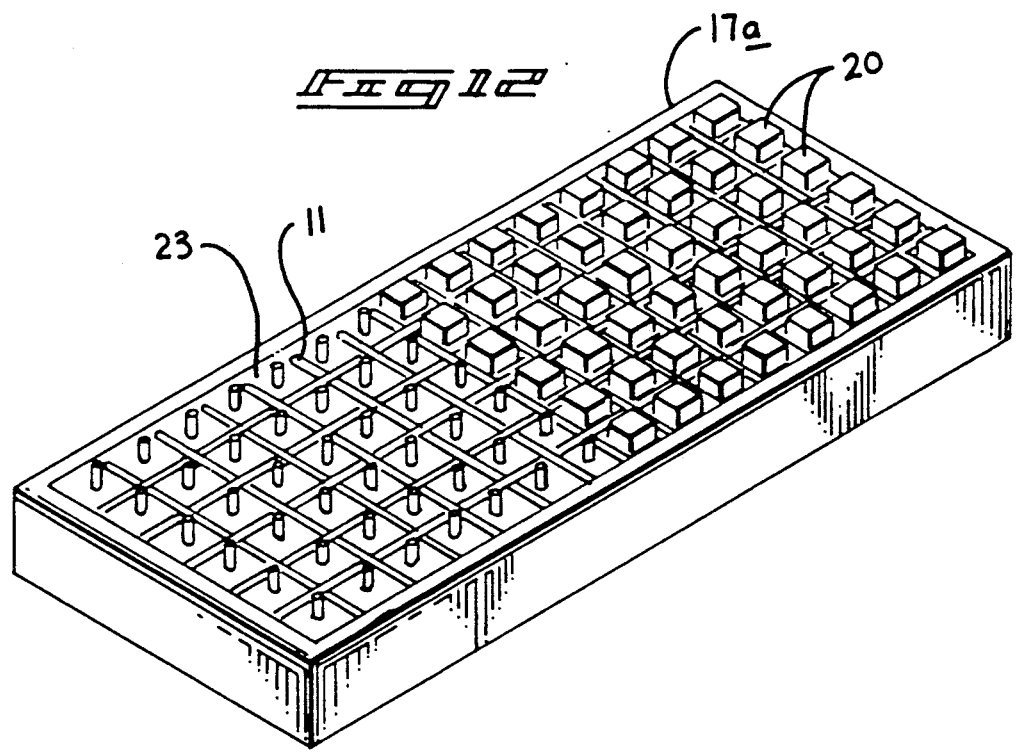

METHOD OF SURFACING SCREEN ORGANIZATION

BACKGROUND OF THE INVENTION

1. Field of the Invention

The field of invention relates to screen grid organizations, and more particularly pertains to a new and improved method of resurfacing screen organizations to permit their repetitive use within an environment, such as a grading and sifting screen subject to erosion and wear during its use with an apparatus such as for a sizing of various particulates.

2. Description of the Prior Art

Screen grids of various types have been utilized throughout the prior art for application to particular usage in a variety of manners. In sifting devices and the like, various particulates are directed through screens, whereupon subsequent erosion and a wear pattern develops within the screen rendering such screens relatively inefficient for an intended sifting procedure. The instant invention attempts to overcome deficiencies of the prior art by reclaiming and resurfacing such organizations to permit their subsequent and continuous use. Examples of prior art screen organizations may be found in U.S. Pat. No. 3,980,555 to Freissle wherein a wear-resistant screen utilizes a synthetic plastic such as polyurethane.

U.S. Pat. No. 4,062,769 to Simon provides an integrally formed elastomeric screen unit, including a multiplicity of sorting apertures provided for longitudinal transverse connection in multiples to form screen bodies for sizing and sifting fragmented hard stock materials in an application as the product of the instant invention is directed.

U.S. Pat. No. 3,970,550 to Frey, et al. sets forth a screen mat including a mold elastomeric body and tension members directed through the body to provide reinforcement to a screen grid.

U.S. Pat. No. 4,486,302 to Jorgensen sets forth a screen organization including utilizing particular wires of the screen positioned and protected against wear.

U.S. Pat. No. 3,833,120 to Ogata sets forth a barber type screen for vibrating sieve including a plurality of apertures containing reinforcement members imbedded throughout the screen laterally to the flow direction of a material being sifted.

As such, it may be appreciated that there continues to be a need for a new and improved method of surfacing screen organizations wherein the same permits excessive resurfacing and repetitive use of a screen organization in a sifting and grading procedure.

SUMMARY OF THE INVENTION

In view of the foregoing disadvantages inherent in the known types of screen organizations now present in the prior art, the present invention provides a method of surfacing screen organizations wherein the same permits a resurfacing of an associated screen organization by a polymeric coating, such as polyurethane, to provide a protective layer against excessive wear during sifting procedures effected by the screen organization. As such, the general purpose of the present invention, which will be described subsequently in greater detail, is to provide a new and improved method of resurfacing screen organizations which has all the advantages of the prior art screen organizations and none of the disadvantages.

To attain this, the present invention provides the steps of resurfacing a screen organization to include an initial mechanical cleaning of the screen organization by tools such as a sandblasting type member to direct abrasive particulates against the screen to effect a roughened surface on the screen. Subsequently, a coating of glue is applied to a bottom surface of the screen, whereupon the screen is positioned within a recessed cavity of a container. Parallelepiped block members are positioned within the openings defined by the screen organization, whereupon subsequently a fluid polymeric, such as polyurethane, is directed within the container, whereupon subsequent curing of the polyurethane permits removal of the newly surfaced screen organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method of surfacing screen organizations which has all the advantages of the prior art screen organizations and none of the disadvantages.

It is another object of the present invention to provide a new and improved method of surfacing screen organizations which may be easily and efficiently manufactured and marketed.

It is a further object of the present invention to provide a new and improved method of surfacing screen organizations which is of a durable and reliable construction.

An even further object of the present invention is to provide a new and improved method of surfacing screen organizations which is susceptible of a low cost of manufacture with regard to both materials and labor, and which accordingly is then susceptible of low prices of sale to the consuming public, thereby making such method of surfacing screen organizations economically available to the buying public.

Still yet another object of the present invention is to provide a new and improved method of surfacing screen organizations which provides in the apparatuses and methods of the prior art some of the advantages thereof, while simultaneously overcoming some of the disadvantages normally associated therewith.

Still another object of the present invention is to provide a new and improved method of surfacing screen organizations wherein the same permits a repetitive resurfacing of screen organizations as required to prolong life and effective usage of such screens in a grading and sifting environment.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a subsequent step in the practice of the instant invention.

FIG. 7 is an isometric illustration of the screen grid mounted within a container in a further step of the instant invention.

FIGS. 8, 9, and 10 are isometric illustrations of a variety of block members utilized in the practice of the instant invention.

FIG. 11 is an isometric illustration of the instant invention illustrating the application of a fluid polymeric material within the container contained in the screen grid.

FIG. 12 is an isometric illustration of a yet further step of the instant invention, whereupon subsequent to curing of the fluid polymeric material, the block members are removed from the container.

DESCRIPTION OF THE PREFERRED EMBODIMENT

Figure 1:
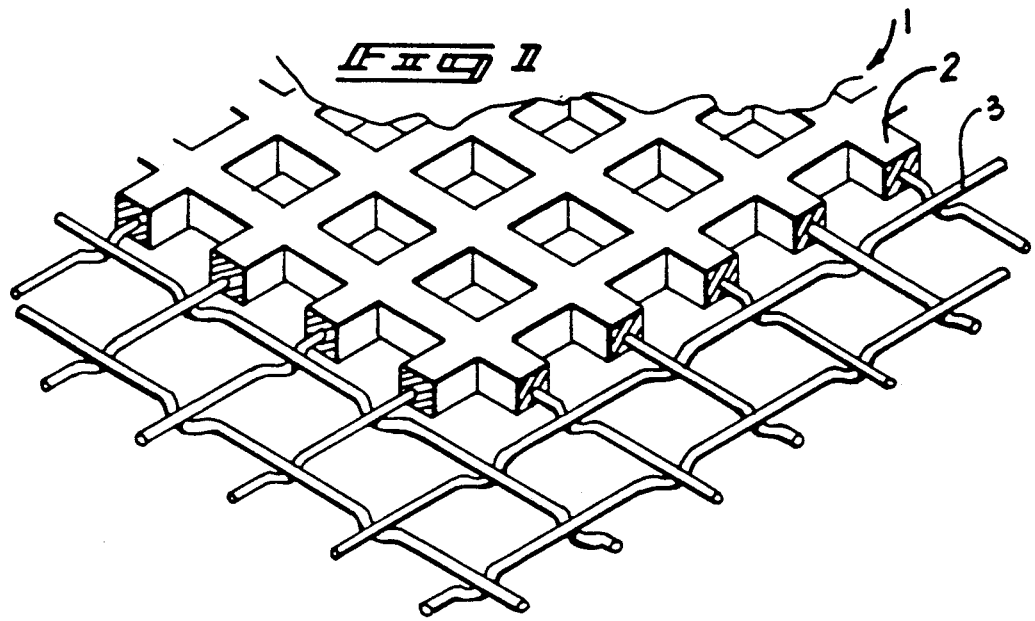
FIG. 1 is a prior art isometric illustration of a screen grid.

With reference now to the drawings, and in particular to FIGS. 1 to 14 thereof, a new and improved method of surfacing screen organizations embodying the principles and concepts of the present invention and generally designated by the reference numerals 11-23 will be described.

Figure 2:
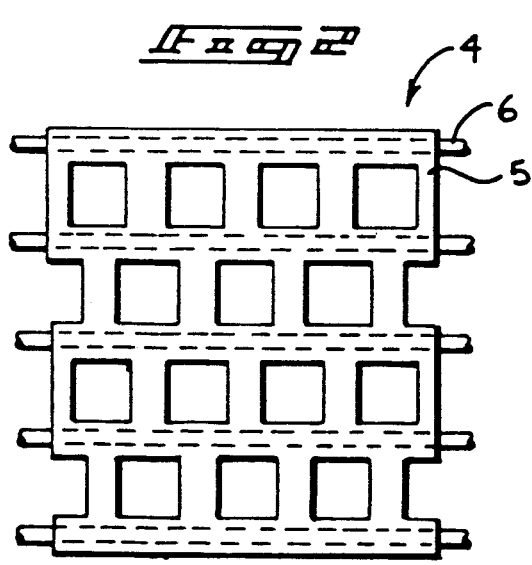
FIG. 2 is an orthographic top view of a further prior art screen grid.
Figure 3:
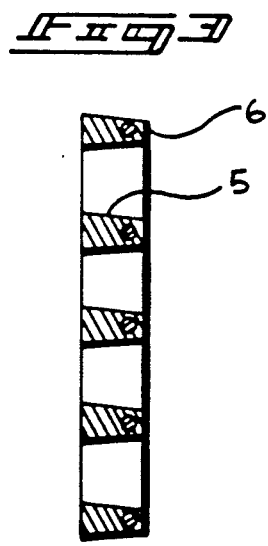
FIG. 3 is an orthographic cross-sectional illustration of the screen grid as set forth in FIG. 2.

FIG. 1 is an isometric illustration of a prior art screen grid 1, wherein a polymeric coating 2 is in surrounding relationship to a screen grid 3. FIG. 2 illustrates a further screen organization 4, illustrating a further example of a series of reinforcing wire members 6 directed through a polymeric screen type member 5 for use in a sifting or grading organization.

Figure 4:
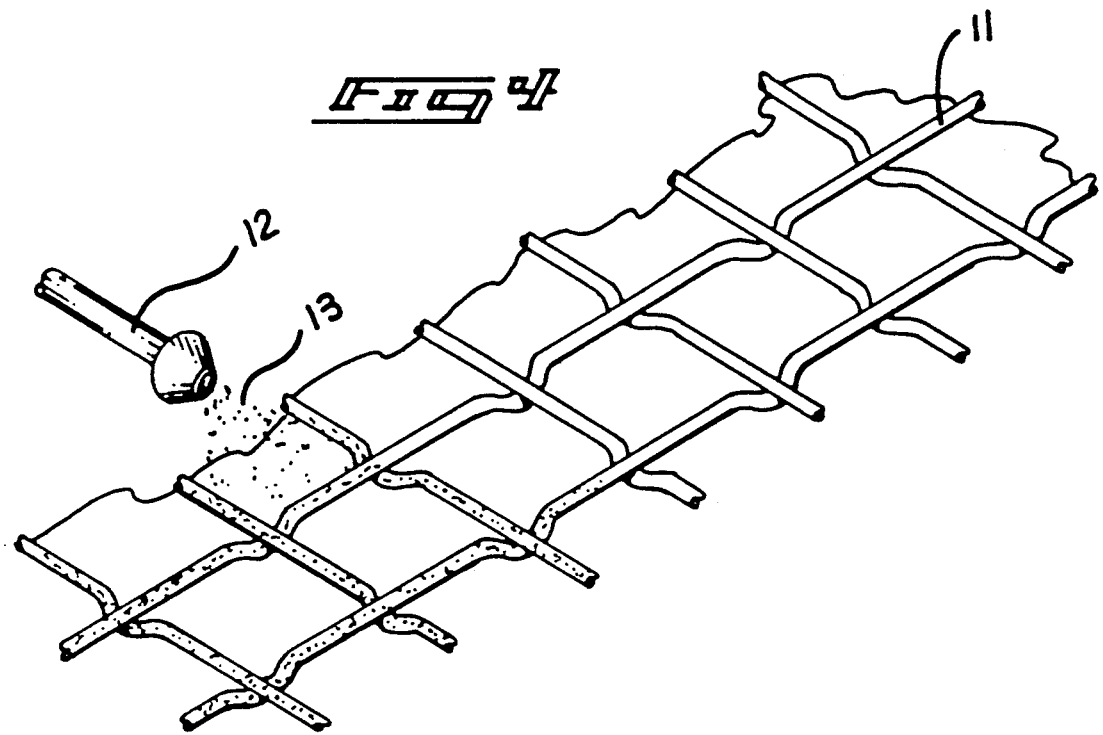
FIG. 4 is an isometric initial step of the method of the instant invention.
Figure 5:
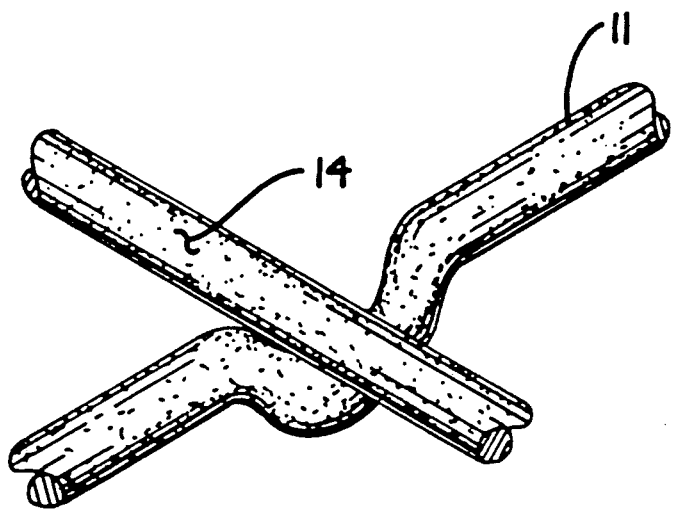
FIG. 5 is an isometric illustration, somewhat enlarged, of the screen organization subsequent to the initial step as set forth in FIG. 4.
Figure 13:
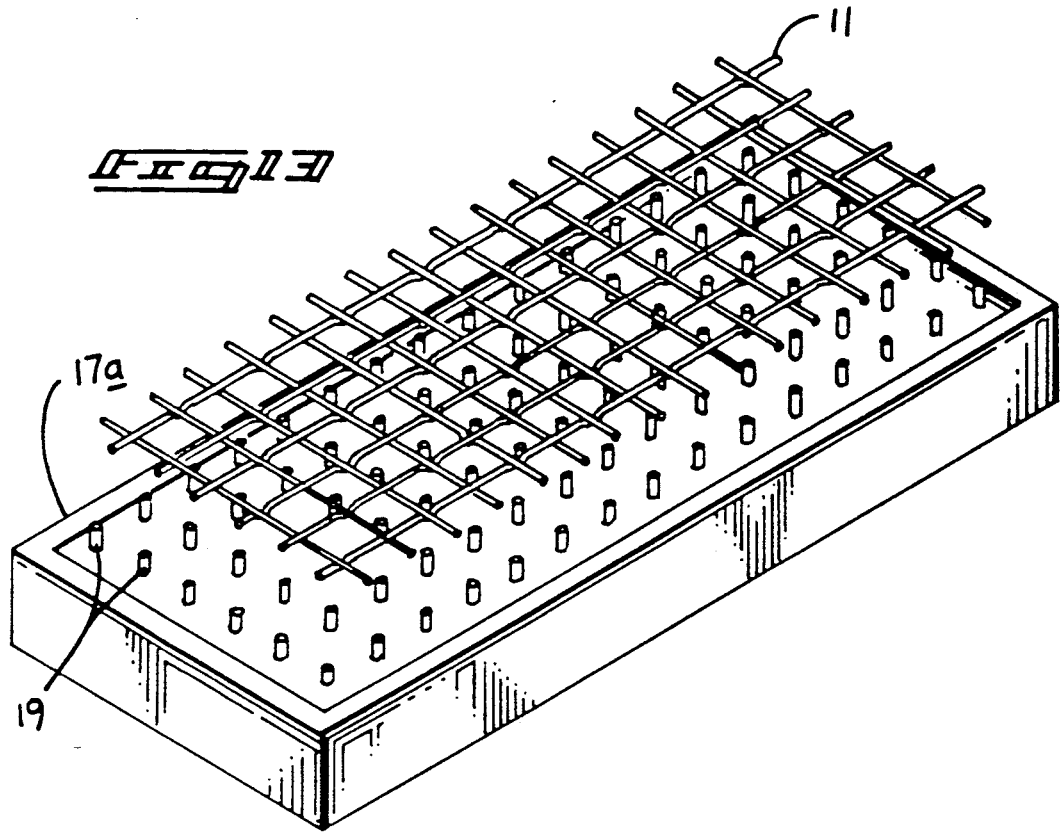
FIG. 13 is an isometric illustration of the instant invention illustrating a further step in a removal of the screen grid from the associated container.
Figure 14:
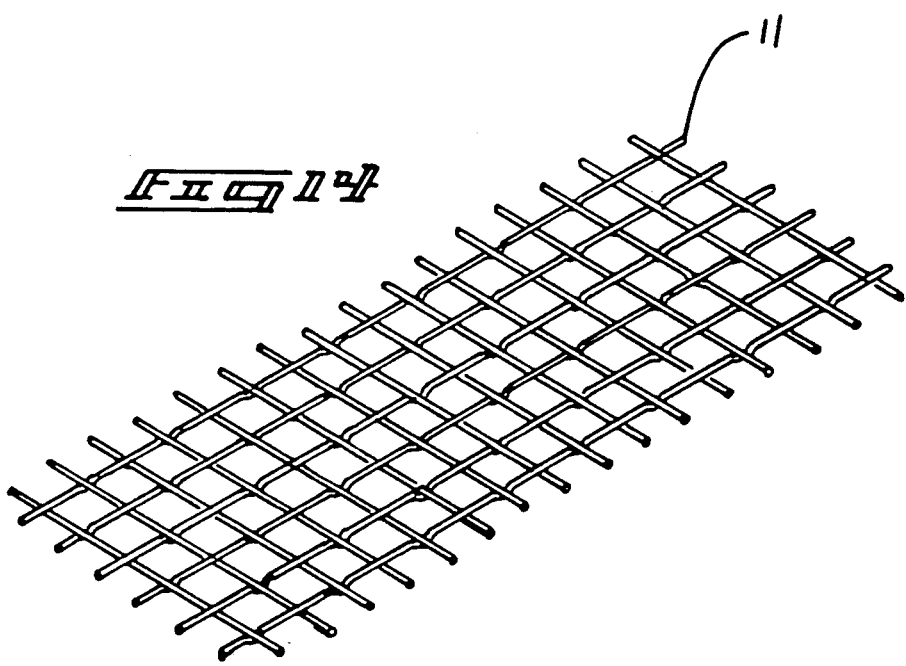
FIG. 14 is an isometric illustration of the resurfaced screen grid of the instant invention.

More specifically, the method of surfacing screen organizations of the instant invention essentially comprises the steps of directing a particle or sandblasting nozzle 12 in cooperation with a screen grid 11 to direct an abrasive particle stream 13 against the screen grid 11 to effect a roughened surface 14 about the entire exterior surface of the screen grid 11 by directing the abrasive particle stream 13 to at least an upper surface, and preferably upper and lower surfaces of the screen grid to effect an initial cleaning, descaling, and roughening of the surface, as illustrated in FIG. 5, and the subsequent reference surface 14 effected by the step, as illustrated in FIG. 4. FIG. 6 illustrates a subsequent step wherein an adhesive 15 is applied to a bottom surface of the screen grid 11 by an applicator 16, whereupon subsequently, as illustrated in FIG. 7, the bottom surface of the screen grid 11 is placed in a facedown orientation relative to a container floor 18 within a recess cavity 17 of a container 17a, whereupon positioning rods 19 of a predetermined geometric configuration are projecting orthogonally relative to the container floor 18 and directed medially through the openings of the screen grid 11. Subsequently, parallelepiped block members 20 (see FIGS. 8, 9, and 10) are positioned overlying the positioning rods 19, wherein each block member includes a cavity 21 of a configuration complementary to that defined by positioning rod 19 to fixedly position and orient each block in a non-slip manner relative to the screen grid. The block members 20 may be formed of a suitable material, such as paper, or block members 20a are available formed of a cellular material such as wood or of a metallic block member 20b to enhance anchoring of each block member relative to the screen organization 11. The block members are defined by a cross-sectional configuration substantially equal to each opening of the screen grid 11, whereupon subsequently, a further nozzle 22 directs a fluid polymeric into the recessed cavity 17 to fill the cavity and completely effect submerging and encasing of the screen grid 11 within the polymeric fluid. Preferably, a polyurethane material is utilized, but it is understood that any suitable covering providing characteristics of resistance to wear and erosion may be utilized. Subsequent to a curing of the polyeric fluid, the block members 20 are removed and subsequently the screen grid 11 is removed from the container 17a for subsequent use within a sifting and grading organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of surfacing screen organizations, including the steps of, providing a screen grid, cleaning the screen grid, providing a container, wherein the container is formed with a recessed cavity, and positioning the screen grid within the recessed cavity, and directing a fluid polymeric to overlie the screen grid, and permitting the fluid polymeric to cure, and removing the screen grid from the container for subsequent use, and wherein the step of cleaning the screen grid includes directing a first nozzle at the screen grid and directing an abrasive particulate stream at the screen grid and effecting a surface roughening of the screen grid, and wherein prior to positioning the screen grid in the container, an adhesive is applied over a bottom surface of the screen grid, and the bottom surface is positioned to overlie a floor defined by the recessed cavity of the container, and wherein prior to application of the fluid polymeric within the container, a positioning block is positioned within each opening of each screen grid, and the positioning block is formed to define a predetermined cross-sectional configuration, and wherein each screen grid opening is defined by the predetermined cross-sectional configuration, and wherein the container floor is formed to include a matrix of positioning rods, and a positioning rod is directed medially of each screen grid opening, and each block member includes a block member cavity to complementarily receive a positioning rod therewithin, and wherein the step of directing the fluid polymeric into the recessed cavity includes completely covering the screen grid by the fluid polymeric, and wherein subsequent to the step of curing the fluid polymeric, the block members are removed from the container, and subsequently the screen grid is removed from the container.

* * * * *